United States Patent [19]

Murty

[11] 4,157,314
[45] Jun. 5, 1979

[54] GRANULAR ACTIVATED CARBON MANUFACTURE FROM SUB-BITUMINOUS COAL TREATED WITH DILUTE INORGANIC ACID: DIRECT ACTIVATION METHOD

[75] Inventor: Hari N. Murty, Grand Island, N.Y.

[73] Assignee: The Carborundum Company, Niagara Falls, N.Y.

[21] Appl. No.: 884,085

[22] Filed: Mar. 6, 1978

[51] Int. Cl.² .................. C01B 31/08; C01B 31/10; C01B 31/14; B01J 21/18
[52] U.S. Cl. .................. 252/444; 252/422; 252/423; 252/445
[58] Field of Search .............. 252/422, 423, 421, 444, 252/445; 423/445, 449, 460, 461; 201/6, 8

[56] References Cited

U.S. PATENT DOCUMENTS

| | | | |
|---|---|---|---|
| 1,899,808 | 2/1933 | Kern | 201/8 |
| 3,539,467 | 11/1970 | Bozarth | 252/445 |
| 3,623,999 | 11/1971 | Jungten | 252/421 |
| 3,876,505 | 4/1975 | Stoneburner | 201/8 |
| 3,998,604 | 12/1976 | Hinkley | 44/1 R |
| 4,014,817 | 3/1977 | Johnson et al. | 252/45 |
| 4,039,473 | 8/1977 | Shafer | 423/460 |

FOREIGN PATENT DOCUMENTS 906754 8/1972 Canada .................. 252/444

Primary Examiner—Winston A. Douglas
Assistant Examiner—P. E. Konopka
Attorney, Agent, or Firm—David E. Dougherty; Robert C. Weber

[57] ABSTRACT

Granular activated carbon is manufactured from sub-bituminous coal by crushing and screening the as received coal containing about 10 to about 25% moisture by weight to produce 8/30 mesh granules, treating the granules with a dilute aqueous solution of inorganic acid at a concentration from about 1 to about 25% by weight to reduce the volatile content and thereby increase the fixed carbon content, the particular concentration being selected to provide the desired activity and porosity of the activated carbon, comprising: mixing the granules with the acid, washing off the acid, and drying the granules at least partially to a moisture content below about 25% by weight. The granules are mixed with from 0 to about 15% by weight of coal tar pitch. The so treated granules are ground to form fine powder of not less than about 60% by weight −325 mesh, preferably more than about 65% by weight −325 mesh, which is compressed into shapes, such as pellets or thin corrugated sheets under high pressure, and then granulated to reform 6/20 mesh granules. These reformed granules are then directly activated, without prior charring and devolatilization, by directly heating to and at a temperature higher than the devolatilizing temperature in an atmosphere containing a gaseous activating agent.

20 Claims, 1 Drawing Figure

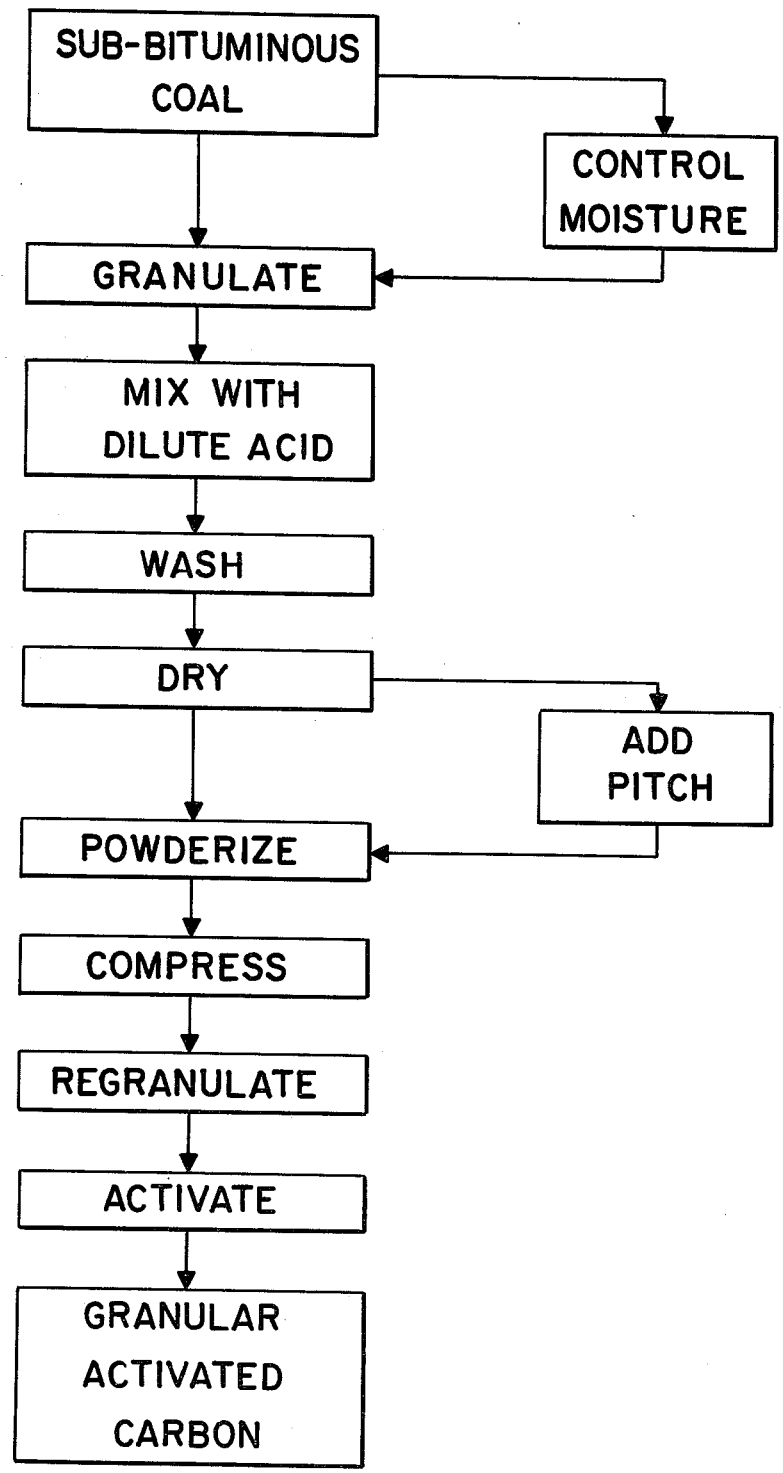

GRANULAR ACTIVATED CARBON MANUFACTURE FROM SUB-BITUMINOUS COAL TREATED WITH DILUTE INORGANIC ACID: DIRECT ACTIVATION METHOD

This invention is related to my copending applications Ser. No. 884,084, filed Mar. 6, 1978 as a continuation-in-part of Ser. No. 818,700, filed July 25, 1977, and now abandoned and Ser. No. 818,699, filed July 25, 1977, as well as to my prior U.S. Pat. No. 4,032,476, issued June 28, 1977.

BACKGROUND OF THE INVENTION

Field of the Invention

This invention relates to granular activated carbon manufacture, and more particularly to a new and improved process for making granular activated carbon from subbituminous coal treated with dilute inorganic acid, and to a new and improved granular activated carbon made by such process and having properties which make it suitable for use in water and waste water treatment and in other applications including air purification.

Glossary of Terms

In order to facilitate a clear understanding of this invention, various terms of art employed herein are defined as follows.

Abrasion number—is a measure of the resistance of the activated carbon granules to degrading on being mechanically abraded. It is measured by contacting a sample with steel balls in a pan on a machine and shaking the contents for a given time and determining the resultant particle size distribution and hence the mean particle diameter. The abrasion number is the ratio of the final average (mean) particle diameter to the original average (mean) particle diameter (determined by screen analysis) times 100.

Activated carbon—is carbon which is "activated" by heating to high temperature preferably with steam or carbon dioxide as the gaseous activating agent in producing an internal porous particle structure.

Activation or activating—means heating coal at high temperatures on the order of about 600° C. to about 1000° C. in the presence of a gaseous activating agent, as is well known in the art. The heating rate during activation from the minimum activation temperature to the maximum activation temperature may vary widely, e.g., from about 100° to about 1000° C. per hour, but usually is nearer 100° C. per hour.

Adsorption isotherm—is a measurement of the adsorptive capacity of an adsorbent (viz. granular activated carbon) as a function of the concentration, or pressure, of the adsorbate (viz. $N_2$) at a given temperature. It is defined as the constant temperature relationship between the amount absorbed per unit weight of adsorbent and the equilibrium concentration, or partial pressure.

Apparent density—is the weight per unit volume of homogeneous granular activated carbon. To assure uniform packing of the granules during measurement, a vibrating trough is used to fill the measuring device.

Ash—is a principal mineral constituent of coal, carbon and pitch. It is normally defined as a weight percent basis after a given amount of sample is reduced to ash.

Average (mean) particle diameter—is a weighted average diameter of a granular activated carbon sample. A screen analysis is run and the average particle diameter is calculated by multiplying the weight of each fraction by its average diameter, adding the products, and dividing by the total weight of the sample. The average diameter of each fraction is taken as the size midway between the sieve opening through which the fraction has passed and the sieve opening on which the fraction was retained. It usually is expressed in mm.

Carbon tetrachloride activity number—is the steady state percentage increase in the weight of a bed of activated carbon after air which has been saturated with carbon tetrachloride at 0° C. is passed through the carbon at 25° C. It is expressed as a percentage number.

Charring—means heating coal at low temperatures on the order of about 175° C. to about 275° C. in the presence of oxygen.

Coking value—is usually expressed as percent residual carbon obtained when a dry sample of coal, tar or pitch is vaporized or pyrolized for a specific time at a specific temperature that limits the available oxygen supply (ASTM Method D-2416). The coking value, expressed as percent residual carbon, indicates the coke forming properties of the material.

Devolatilizing—means heating coal at intermediate temperatures on the order of about 400° C. to about 600° C. in an oxygen-free atmosphere.

Direct activation or directly activating—means heating a coal, preferably in a granular form, directly (without prior charring and devolatilization) and rapidly (at a heating rate of about 500° C. per hour or more) to an activating temperature higher than the devolatilization temperature (of the order of 600° to 1000° C.) in an atmosphere containing a gaseous activating agent and maintaining the desired activating temperature for the desired period of time.

Granular activated carbon—is "activated carbon" which has a particle size, i.e., "mesh", which is not less than about 40 and preferably not less than about 60.

Iodide number—is the milligrams of iodine adsorbed by one gram of granular activated carbon at an equilibrium filtrate concentration of 0.02 N iodine. It is measured by contacting a single sample of carbon with an iodine solution and extrapolating to 0.02 N by an assumed isotherm slope. This number can be correlated with the ability of granular activated carbon to adsorb low molecular weight substances.

Mesh—(or mesh size) is the particle size of granules as determined by the U.S. Sieve Series or the Tyler Series. Usually, this term refers to the sizes of the two screens, in either of the above Series, between which the bulk of a sample falls. For example, "8/30 mesh" (or "8 by 30 mesh" or "8 × 30 mesh") means that 90% by weight of the sample will pass through a No. 8 screen but will be retained on a No. 30 screen. Alternatively, this term refers to a maximum particle size, such as in defining the fineness of powder material. For example, "65% by weight -325 mesh powder" means that 65% by weight of a given sample passes through a No. 325 mesh screen.

Molasses number—is calculated from the ratio of the optical densities of the filtrate of a molasses solution treated with a standard activated carbon and the activated carbon in question.

Pitch—is a black or dark viscous substance obtained as a residue in the distillation of organic materials and especially tars.

Powder—means powdered activated carbon which has a particle size, i.e., "mesh", which is smaller than about 40 and preferably smaller than about 60. The larger the mesh number, the smaller the size.

Sub-bituminous coal—is an intermediate stage coal which ranks above lignite and brown coals, but below bituminous coal. In the as received condition it has, by weight, (1) a proximate analysis of: from about 10% to about 25% moisture, from about 35% to about 45% volatile material, from about 2% to about 5% ash, and from about 25% to about 45% fixed carbon, and (2) an ultimate analysis of: from about 65% to about 75% carbon, from about 4% to about 8% hydrogen, from about 0.5% to about 2.0% nitrogen, and from about 0.5% to about 1.0% sulfur. See ASTM Standard D-388-66.

Surface area—is the amount of surface area per unit weight of granular activated carbon; it is determined from the nitrogen adsorption isotherm by the Brunauer, Emmett and Teller (BET) method, and it is expressed in $m^2$/gram.

Prior Art

Granular activated carbon is particularly useful in water and waste water treatment not only because it is highly effective in purifying the intake, as well as the effluent from municipal and industrial systems, but also because it can be regenerated for repeated use. However, in order to accomplish these objectives it must possess certain properties, namely, a minimum surface area of about 900 $m^2$/gram for adequate adsorption capacity, a minimum Iodine number of about 900 for adequate adsorption of low molecular weight substances, a minimum Molasses number of about 200 for adequate decolorizing, a maximum ash content (by weight) of not more than about 12%, and preferably not more than about 8% for purity, a minimum abrasion number of about 70 and preferably not less than about 80, for adequate hardness in maintaining granular integrity in use and in regeneration, and a minimum apparent density of not less than about 0.46 gram/cc, preferably not less than about 0.48 gram/cc, for obtaining the dense, closely packed beds and columns needed in water and waste water treatment. Granular activated carbon also is useful for gas and air purification applications. In such applications the Iodine number should not be below a minimum of about 1,000 and the Molasses number should be less than 200, more preferably an Iodine number of about 1,050 and a Molasses number of about 180, and a minimum carbon tetrachloride number of about 50, more preferably about 60.

These properties can be obtained by making granular activated carbon from bituminous coal and from sub-bituminous coal, such as disclosed in each of my aforesaid copending applications, and my aforesaid patent, but until the present invention it is not known that anyone else has accomplished this by dilute inorganic acid treatment of sub-bituminous coal without charring or devolatilization before activation.

As described in my aforesaid application Ser. No. 884,084 hard granular activated carbon could not be made from bituminous coal without subjecting the granules to charring prior to devolatilization and activation. During the course of experimentation, granules were devolatilized without the charring step and a fused mass (instead of granules) unsuitable for activation was obtained, thus indicating the necessity and importance of the charring and devolatilization steps for bituminous coal. The charring or oxidation step was also considered essential in making activated carbon not only from bituminous coal, as disclosed in Olson U.S. Pat. No. 3,483,134, but also from bituminous, sub-bituminous or lignite coal as disclosed in Stoneburner U.S. Pat. No. 3,876,505. The Johnson et al. U.S. Pat. No. 4,014,817 disclosed an improvement on the process in U.S. Pat. No. 3,876,505 which improvement comprised acid washing the coal prior to carrying out the manufacturing method but still required the oxidizing step. Moreover, none of these patents discloses a hard granular activated carbon product.

In my aforesaid application Ser. No. 884,084, I disclosed an improved method of making hard granular activated carbon from sub-bituminous coal which included an inorganic acid treatment of the coal and elimination of the charring or oxidation step prior to devolatilization in an oxygen-free atmosphere. In my inventive process disclosed in the present application I have discovered that both charring and devolatilization steps can be eliminated prior to activation.

SUMMARY OF THE INVENTION

Accordingly, a general primary objective of the present invention is (1) to provide a new and improved process for making hard granular activated carbon from lower cost sub-bituminous coal instead of higher cost bituminous coal, and wherein both the charring and devolatilization steps necessary for processing bituminous coal are eliminated, while the overall yield of granular activated carbon is increased significantly by appropriate treatment of sub-bituminous coal with a dilute aqueous solution of inorganic acid, with or without the addition of carbonaceous binder and without the step of devolatilization prior to activation; (2) as well as to provide new and improved hard granular activated carbons made by such process and having the aforementioned desired properties of adsorption (as measured by surface area and Iodine number), decolorization (as measured by Molasses number) gas and air purification (as measured by the carbon tetrachloride number), purity (as measured by ash content), hardness (as measured by abrasion number) and density (as measured by apparent density), which make them suitable for use in water and waste water treatment and in other applications including gas and air purification. To this end, the invention includes (1) a process for making hard granular activated carbon suitable for use in water and waste water treatment and in other applications such as gas and air purification, comprising: forming granules from sub-bituminous coal; treating the granules with a dilute aqueous solution of inorganic acid of predetermined concentration to reduce the volatile content and thereby increase the fixed carbon content comprising: mixing the granules with the acid, washing off the acid, and drying the granules at least partially to a moisture content below about 25% by weight; mixing the treated granules with 0 to about 15% by weight of a carbonaceous binder such as pitch; reducing the treated granules to form fine powder; compressing the powder to form shapes; reducing the shapes to reform granules; and thereafter directly activating the reformed granules by directly heating to and at a temperature higher than the devolatilizing temperature in an atmosphere containing a gaseous activating agent; and (2) hard granular activated carbon made by such process and having the physical characteristic of high granular integrity permitting repeated handling, use, regeneration and reuse. The shapes may be of various configurations larger than the granules such as pellets, briquettes, thin sheets of corrugated cross-section, etc.

A specific primary objective is to provide (1) such process wherein granules are formed from sub-bituminous coal having a moisture content of not more than about 25% by weight, preferably about 10 to about 25% by weight, and an ash content of not more than about 5% by weight, preferably about 2% by weight; the acid may be any suitable inorganic acid including $H_2SO_4$, $H_3PO_4$, HCl, $HNO_3$ and other oxy acids of Sulphur, Phosphorous, Chlorine and Nitrogen, and mixtures thereof, the preferred acid is $H_3PO_4$, and the acid concentration is from about 1 to about 25% by weight; the treated granules are reduced to powder of not less than about 60% by weight $-325$ mesh, preferably of more than about 65% by weight $-325$ mesh, and more preferably about 75 to about 85% $-325$ mesh; the powder is compressed or compacted to form shapes under a pressure of about 40,000 psi or more, or the powder is continuously compressed to form shapes and the fines are recycled; and thereafter the granules are directly activated by heating to a temperature of about 600° C. to about 1000° C. for a time of about 1 hour to about 6 hours; in order to produce an overall yield of granular activated carbon of not less than about 22%, preferably not less than about 24% by weight, dry basis; and (2) such granular activated carbon made by such process and having a surface area of not less than about 900 $m^2$/gram, preferably not less than about 1000 $m^2$/gram; an Iodine number of not less than about 900, preferably not less than about 1000; an ash content, by weight, of not more than about 12%, preferably not more than about 8%, and more preferably not more than about 7% by weight, an abrasion number of not less than about 70, preferably not less than about 75, and more preferably not less than about 80, an apparent density of not less than about 0.46 gram/cc, preferably not less than about 0.48 gram/cc; and a Molasses number of not less than about 200, preferably not less than about 220 for hard granular activated carbon suited for water and waste water applications, and for hard granular activated carbon suited for gas or air purification applications, in addition to the above properties, a low Molasses number, i.e., less than about 200, more preferably about 180 and a carbon tetrachloride number of at least about 50, more preferably about 60.

A further specific primary objective is to provide (1) such process wherein the acid concentration is relatively low, namely from about 1 to about 12% by weight, preferably from about 2 to about 5% by weight; and (2) such granular activated carbon made by such process and especially suited for water and waste water applications and having a 900 minimum Iodine number, 200 minimum Molasses number, more preferably, 950 Iodine number, 220 Molasses number or higher and an Abrasion number of at least 70 or higher.

A further specific primary objective is to provide (1) such process wherein the acid concentration is relatively high, namely from 12 to about 25% by weight, preferably from about 15 to about 25% by weight; and (2) such granular activated carbon made by such process and especially suited for gas and air purification applications and having a minimum Iodine number of about 1000, a very low Molasses number, i.e., less than about 200, more preferably an Iodine number of about 1050 and Molasses number of about 180 and a minimum carbon tetrachloride number of about 50, more preferably about 60.

Another specific primary objective is to provide (1) such process wherein the granules after being washed to remove the acid are dried partially to a moisture content of about 10 to about 25% by weight, preferably about 15% by weight, with 0% addition of a carbonaceous binder; and the overall yield is not less than about 22% by weight, preferably not less than about 25% by weight dry coal basis; and (2) such granular activated carbon made by such process and having a surface area of not less than about 900 $m^2$/gram, an Iodine number of not less than about 1000, an ash content of not more than about 6% by weight, an abrasion number of not less than about 70, preferably not less than about 80, and an apparent density of not less than about 0.48 gram/cc.

Still another specific primary objective is to provide (1) such pitchless process wherein the acid is $H_3PO_4$ and the overall yield is not less than about 22% by weight, dry coal basis; and (2) such granular activated carbon made by such process and having an ash content of not more than about 6% by weight, and an apparent density of not less than about 0.47 gram/cc.

Yet another specific primary objective is to provide (1) such process wherein the acid is $H_3PO_4$, the granules after being washed to remove the acid are dried to a moisture content below about 15% by weight, preferably to about 10% by weight or below, and thereafter mixed with about 5 to about 15% by weight of carbonaceous binder such as pitch and the overall yield is not less than about 24% by weight, preferably not less than about 30%, dry coal binder mixture basis; and (2) such granular activated carbon made by such process and having a surface area of not less than about 900 $m^2$/gram, an Iodine number of not less than about 940, preferably not less than about 1000, an ash content of not more than about 6% by weight, an Abrasion number of not less than about 70, preferably not less than about 80, an apparent density of not less than about 0.8 gram/cc, preferably not less than about 0.49 gram/cc, and a Molasses number of not less than about 210, preferably not less than about 220.

Additional objectives and advantages of the invention will become apparent upon consideration of the following detailed description and accompanying drawing wherein:

BRIEF DESCRIPTION OF THE DRAWING

The single FIGURE is a block diagram or flow sheet illustrating schematically the various steps of the process, as well as the resulting product, both embodying the invention.

DESCRIPTION OF THE PREFERRED EMBODIMENTS

In this detailed description, reference will be made to seven Examples which are illustrative of the invention.

The following Examples 1–7 represent preferred embodiments of the present invention, which is represented schematically in the drawing. It will be noted that the devolatilization step, previously thought to be necessary, as disclosed in my aforesaid copending application Ser. No. 884,084, has been eliminated. Thus, from a method standpoint, the inventive process generally includes the steps of granulating the sub-bituminous coal, which either has, in the as received condition, the proper moisture content range of about 10 to about 25% by weight, or is dried or wetted, as shown at the upper right of the drawing, to so control such moisture content prior to granulating; followed by the steps of treating the granules with a dilute aqueous solution of inorganic acid to reduce the volatile content and thereby increase the fixed carbon content comprising: mixing the granules with the acid, washing off the acid and drying the granules at least partially to a moisture content below about 25% by weight; mixing the treated granules with from 0 to about 15% by weight of a carbonaceous binder such as pitch; powderizing; compressing; regranulating; and without prior charring and devolatilizing, directly activating; all in order to produce the desired inventive products of granular activated carbons which are acceptable for use in water and waste water treatment and in other applications including gas and air purification.

EXAMPLE 1

Dilute $H_3PO_4$ Treated Sub-bituminous Coal Granules in Making Granular Activated Carbon The starting material for this and each of the ensuing Examples was a batch of Wyoming sub-bituminous coal having the following analyses, % by weight in the as received and dry conditions:

| Proximate Analysis | | | Ultimate Analysis | |
| --- | --- | --- | --- | --- |
| | As Received | Dry | | Dry |
| Moisture | 17 | — | Carbon | 69.8 |
| Volatile Material | 44 | 53 | Hydrogen | 5.4 |
| Ash | 2.05 | 2.48 | Nitrogen | 0.9 |
| Fixed Carbon | 34 | 42.20 | Sulfur | 0.55 |

These analyses are, in general, typical of a sub-bituminous coal. The as received coal was crushed and screened to obtain 8 × 30 mesh granules. 300 Grams of the granules were loaded into a 4 liter kettle, and a dilute aqueous acid solution consisting of 150 cc. of 85% concentration $H_3PO_4$ and 2850 cc. of water was added to the granules (about 8.1% acid, by weight). The granules and the acid solution were heated to 80° C. and maintained at this temperature for 5 hours, while the granules were continuously stirred. During the course of experimentation, it was learned that size of granules, temperature of treatment (which is usually below 100° C. because of the use of the dilute aqueous acid solution), time of treatment, concentration of acid, and the ratio of dilute aqueous acid solution to coal all have important effects on further processability of the coal to form granular activated carbon. Therefore, the specific numbers cited in this and the ensuing inventive Examples are merely illustrative and not restrictive. For example, both coarser and finer granules can be employed during treatment with corresponding results, with the time of treatment being longer for coarser particles and shorter for finer particles.

The contents of the slurry were allowed to cool, the solution decanted, and the granules were thoroughly rinsed such that the wash water off the granules analyzed to a pH of 6 to 7. The washed granules were dried to a moisture content below 15%, preferably to 10% or below, and mixed with approximately 10% by weight of No. 125 coal tar pitch having the following properties:

| Softening Point | 129.2° C. |
| --- | --- |

| -continued | |
| --- | --- |
| Benzene Insolubles | 33.2% by weight |
| Quinoline Insolubles | 13.1% by weight |
| Coking Value (Conradson) | 61.1% by weight |
| Ash | 0.17% by weight |

The mixture was milled into a very fine powder such that more than 65% by weight of the material passed through 325 mesh screen, preferably 75 to 85% −325 mesh. The powder was pressed into cylindrical shapes such as pellets of ½ inch diameter and ½ inch high using a pressure of 40,000 to 80,000 psi, the apparent density of the pellets being in the range of 1.1 to 1.2 grams/cc. These pellets were regranulated to obtain 6 × 20 mesh granules having an apparent density of 0.64 to 0.68 gram/cc.

The granules, which had an apparent density of 0.64 to 0.68 gram/cc, were loaded into a cylindrical furnace and subjected to direct activation, without prior charring and devolatilization, by directly heating the granules rapidly, i.e., at a rate in excess of 500° C. per hour to 800° to 900° C. in an atmosphere composed of $N_2$ and steam, and by maintaining the granules at this temperature for 4 to 5 hours. The amount of steam fed into the furnace was precalibrated such that it amounted to 1 to 3 grams of steam/gram of charge/hour. This direct activation step can be varied, such as by using a heating rate of about 500° C. per hour or more, e.g., about 1000° C. per hour, to the desired activating temperature on the order of about 600° C. to about 1000° C., with the time of activation ranging from about 1 hour to about six hours in an atmosphere containing one or more gaseous activating agents such as $CO_2$, air and steam. During activation, the heating rate may vary widely, e.g., from about 100° C. per hour to about 1000° C. per hour from the minimum to the maximum activation temperature, but usually is nearer to 100° C. per hour.

The resulting overall yield of granular activated carbon, based on dry coal pitch mixture, was in the range of 24 to 28% by weight. The granules had a surface area of 900 to 1100 m²/gram, an Iodine number of 1050, an ash content of 5 to 6% by weight, an abrasion number of 70 to 80 and an apparent density of 0.48 gram/cc.

Thus, these granules were hard, very adsorptive, low in ash and in most respects comparable to the grades of granular activated carbon preferred for use in water and waste water treatment and in other applications. Further, it is to be noted that not only can an acceptable hard granular activated carbon product be made from sub-bituminous coal without devolatilization employing a separate kiln and controlled heating rate, and without charring, but also that treatment with dilute aqueous acid solution significantly increases yield and adsorption while also reducing ash content, as compared to charring of sub-bituminous coal with no acid treatment. It also is noteworthy that a hard granular activated carbon possessing high granular integrity permitting repeated handling, use, regeneration and reuse was prepared from sub-bituminous coal for the first time without charring and devolatilization.

EXAMPLE 2

Dilute $H_3PO_4$ Treated Sub-bituminous Coal Granules (without Pitch) in Making Granular Activated Carbon A batch of Wyoming sub-bituminous coal having the analyses described in Example 1 was crushed and screened to obtain 8 × 30 mesh granules, 300 grams of which were loaded into a 4 liter kettle. A dilute aqueous acid solution consisting of 150 cc of 85% concentrated $H_3PO_4$ and 2850 cc of water was added to the granules (about 8.1% by weight). The granules and the acid solution were heated to 80° C. and maintained at this temperature for 5 hours, while the granules were continuously stirred. The contents were allowed to cool, the solution decanted, and the granules were thoroughly rinsed such that wash water off the granules analyzed to a pH of 6 to 7. To complete the treatment, the washed granules were dried partially to an approximate moisture content of 15%.

The treated granules containing roughly 15% by weight of moisture were milled into a very fine powder such that more than 65% by weight of the material passed through 325 mesh screen (65% by weight −325 mesh), preferably 75 to 85% −325 mesh.

The powder was pressed into cylindrical pellets of ½ inch diameter and ½ inch long using a pressure of 40,000 to 80,000 psi, and the apparent density of the pellets was in the range 1.1 to 1.2 grams/cc. The pellets were re-granulated to obtain 6 × 20 mesh granules which had an apparent density of 0.58 to 0.62 gram/cc.

The overall yield of granular activated carbon, based on the dry coal was in the range of 22 to 26% by weight, versus 24 to 28% for Example 1. The granules had a surface area of 900 to 1100 $m^2$/gram, an Iodine number of 1000, an ash content of 5 to 6% by weight, an abrasion number of 70, and an apparent density of 0.47 to 0.50 gram/cc. as compared to 0.48 for Example 1.

Thus the resulting granules were hard, very adsorptive, low in ash, and in most respects comparable to the grades of granular activated carbon preferred for use in water and waste water treatment and in other applications. It is to be noted that an acceptable hard product can be made from sub-bituminous coal without a carbonaceous binder and without charring and devolatilization, and that treatment with dilute aqueous acid solution significantly increases yield and adsorption.

EXAMPLES 3 TO 5

A batch of Wyoming sub-bituminous coal having analyses described in Example 1 was, crushed, screened and treated in dilute $H_3PO_4$ solutions as described in Example 1; however, a range of acid concentrations from about 1 to about 21% by weight were employed. The acid treated coal granules were washed and mixed with pitch and milled into fine powders, which were compacted and granulated as in Example 1. The granules were activated directly without charring or devolatilization as described in Example 1. The following table summarizes the results of all five Examples:

From the Examples above, it will be seen that changing the acid concentration does affect the relative properties of granular activated carbons. In general, the activity of the carbons (as measured by Iodine and Molasses numbers) can be increased or decreased by activating for longer or shorter times respectively at any particular temperature. The density of the carbons shows an opposite trend, i.e., higher activity carbons lower density and vice versa. For proper comparison, volume activity (Iodine number × density and/or Molasses number × density) has been chosen as the basis for comparison to eliminate comparisons at differing densities or activities.

From the table it is seen that increasing the acid concentration increases the Volume Iodine Number while decreasing the Volume Molasses Number. This also increased the carbon tetrachloride number for the activated carbon, which is an important property for gas and air purification applications. The activated carbon of Example 5 is particularly well suited to gas and air purification applications and had a carbon tetrachloride number of 50–60.

EXAMPLE 6

Dilute $H_3PO_4$ Treated Sub-bituminous Coal Granules (with Pitch) in Making Granular Activated Carbon on a Larger Scale A batch of Wyoming sub-bituminous coal, obtained in car loads, and having the average analyses described in Example 1 was crushed and screened to obtain 8 × 30 granules. A dilute aqueous acid solution containing 60 lbs of 85% $H_3PO_4$ and 300 gallons (1 gal. = 8.4 lbs.) of water was loaded in a large acid treatment tank (about 2.3% by weight). To this, 1500 lbs. of as received coal granules were added. The granules and acid solution were heated to 180°–200° F. (82°–93° C.) and maintained at this temperature for 1 hour while being stirred. Then the contents of the slurry were piped to a wash station where the acid solution was drained and the coal was subsequently washed to a pH of 6.

The washed coal then was dried to a moisture content of about 5 to about 10% by weight in a rotary kiln at 300°–325° F. (149°–163° C.) in a gentle concurrent stream of inert gas to avoid reaction with air in the kiln. The dried coal granules were mixed with the coal tar pitch of Example 1 in the ratio of 90 parts coal and 10 parts pitch, and the two were fed together into a bowl mill where the material was ground to a fine powder or dust which analyzed to 60–65% −325 mesh. This coal pitch mixture was fed into a compactor where it was compacted continuously between grooved rollers (manufactured by The Fitzpatrick Company, Elmhurst, Illinois) at an applied hydraulic pressure of about 2,300 psi in the cylinder, or 10,000 pounds load per linear inch applied to the rollers. This produced thin (about ¼ inch thick) sheets of corrugated cross-section, which then were crushed in a rotary mill to form 6/20 mesh granules. The oversized granules were regranulated and again screened while the undersized granules were recompacted, and this continuous compressing and recycling is believed to contribute to the hardness of the reformed granules. The compacted and reformed granules had an apparent density of 0.65 to 0.68 gram/cc.

| | | | | | PROPERTIES OF GRANULAR ACTIVATED CARBONS | | | |
|---|---|---|---|---|---|---|---|---|
| Example Number | Acid Concentration Weight % | Density gm/cc | Iodine Number | Molasses Number | Vol. Iodine No. (Dens. × Iodine No.) | Vol. Molasses No. (Dens. × Mo. No.) | Abrasion Number | Carbon Tetra-Chloride Number |
| 1 | 8.1% | .48 | 1050 | 210 | 500 | 101 | 80 | |
| 2 | 8.1% | .47 | 1000 | 220 | 470 | 94 | 70 | |
| 3 | 1.7% | .46 | 950 | 240 | 437 | 110 | 73 | |
| 4 | 5% | .47 | 1000 | 230 | 470 | 108 | 80 | |
| 5 | 21% | .48 | 1200 | 180 | 576 | 86 | 80 | 50 – 60 |

The reformed granules next were subjected to direct activation. They were fed into the top of a vertical multiple (8) hearth Herreshoff furnace wherein the granules were slowly activated and discharged from the bottom hearth, with the temperature ranging from about 600° C. at the top hearth to about 1000° C. at the bottom hearth for a total residence time of about 6 hours. The heating rate from ambient to 600° C. was in excess of 500° C. per hour, and thereafter was about 100° C. per hour. The atmosphere employed contained the combustion products of natural gas and air and steam. The overall product yield through the multiple hearth furnace was about 30%, based on dry coal pitch mixture.

The discharged granules were screened, and samples then taken and analyzed, with the following results.

| PROPERTY | |
|---|---|
| Iodine Number | 940 |
| Molasses Number | 220 |
| Abrasion Number | 80 |
| Apparent Density (gm/cc) | .49 |
| Means Particle Diameter (mm) | 1.63 |
| Moisture Content (% by weight) | 0.2% |

A carbon of this type is very hard (as measured by abrasion number of 80), adsorptive (as measured by the high Iodine and Molasses numbers), making it extremely well suited for use in industrial and municipal water purification use.

From the foregoing inventive Examples 1-6 it will be seen that the present invention is unique in providing for the first time a process for producing hard granular activated carbons from sub-bituminous coals by directly activating the acid treated compacted coal granules, either with or without pitch, whereby both of the traditional steps of charring and devolatilization are eliminated. A further inventive aspect in connection with the present process is the discovery that a variety of granular carbons having predetermined physical properties can be produced by changing the concentration of the acid used in the acid treating step. In accordance with the inventive process hard granular activated carbons especially suited for water and waste water applications may be produced by employing lower acid concentrations of from about 1 to about 12% by weight, where the preferred properties are about 900 minimum Iodine number and about 200 minimum Molasses number, more preferably about 950 Iodine number and about 200 Molasses number or higher, and Abrasion number of about 70 or higher. In addition, Examples 3, 4 and 6 illustrate that the acid concentration readily can be reduced considerably below the 8.1% by weight employed in Example 1 and to about 1.7%, 5% and 2.3% respectively, and still produce effective results, with obvious reduction in material cost. Thus, it has been determined that the more preferred acid concentration range is from about 2 to about 5% by weight.

To produce hard granular activated carbons especially suited for gas and air purification applications, the inventive process employs relatively higher acid concentrations for the acid treatment; i.e., from 12 to about 25% by weight, preferably from about 15 to about 25% by weight where the preferred properties are about 1000 minimum Iodine number and very low Molasses number, i.e., less than about 200, preferably about 1050 Iodine number and Molasses number of about 180.

The next Example represents the workability of HCl as the dilute aqueous acid in the inventive technique.

EXAMPLE 7

Dilute HCl Treated Sub-bituminous Coal in Making Granular Activated Carbon

A batch of Wyoming sub-bituminous coal having the typical analyses described in Example 1 was crushed and screened to obtain 8 × 30 granules. 300 grams of the granules were loaded into a 4 liter kettle and a dilute aqueous acid solution consisting of 300 cc of 37.5% concentrated HCl and 2700 cc of water was added to the granules (about 11% by weight). The granules and the acid solution were heated to 80° C. and maintained at this temperature for 5 hours, while the granules were continuously stirred.

The contents of the kettle were allowed to cool, the solution decanted and the granules thoroughly rinsed such that the wash water off the granules analyzed to a pH of 6 to 7. The granules were dried to 15% moisture, were further processed without a carbonaceous binder, as in Example 2 to a granular activated carbon product.

The partially dried coal granules were milled to a very fine size, such that more than 65% of the material passed through 325 mesh, preferably 75 to 85% of the material passed through 325 mesh. The powder was pressed into cylindrical pellets of ½ inch diameter and ½ inch high using pressure of 40,000 to 80,000 psi; the apparent density of the pellets being in the range 1.1 to 1.2 grams/cc. These pellets were regranulated to 6 × 20 mesh having an apparent density of 0.60 to 0.65 gram/cc, and these granules were directly activated, as in Example 1.

The resulting overall yield of granular acivated carbon, based on dry coal (pitchless), was 25 to 28% by weight. The granules had an Iodine number of about 1000 and a Molasses number of 210 to 220 and an Abrasion number of 80, indicating the applicability of HCl acid for acid treatment in the process described in Example 2.

While the foregoing specific Examples described in this application have been in connection with dilute $H_3PO_4$ and dilute HCl it is to be understood that any suitable dilute inorganic acid may be used for the acid treatment described herein including $H_2SO_4$, $H_3PO_4$, HCl, $HNO_3$ and other oxy acids of Sulfur, Phosphorous, Chlorine and Nitrogen, and mixtures thereof.

It now is seen how the invention accomplishes its various objectives, likewise it is to be understood that while the invention has been described and illustrated herein by reference to certain preferred embodiments the same are to be considered as illustrative, rather than as limiting.

What is claimed is:

1. A process for making hard granular activated carbon having a minimum abrasion number of about 70 comprising:
    forming granules from sub-bituminous coal;
    treating the granules with a dilute aqueous solution of inorganic acid, at a concentration from about 1 to about 25% by weight, to reduce the volatile content and thereby increase the fixed carbon content comprising: mixing the granules with the acid for a time and at a temperature and solution to coal ratio sufficient for further processing, washing off the acid, and drying the granules at least partially to a moisture content below about 25% by weight;

mixing the treated granules with from 0 to about 15% by weight of a carbonaceous binder;
reducing the treated granules to form fine powder;
compressing the powder to form shapes;
reducing the shapes to reform granules;
and thereafter directly activating the reformed granules, without charring and devolatilizing, by directly heating to and at a temperature higher than the devolatilizing temperature in an atmosphere containing a gaseous activating agent.

2. Hard granular activated carbon made by the process of claim 1.

3. The process of claim 1 wherein the coal has a moisture content of not more than about 25% by weight and an ash content of not more than about 5% by weight.

4. The process of claim 1 wherein the overall yield of granular activated carbon is not less than about 22% by weight, dry basis.

5. The process of claim 1 wherein the acid is $H_3PO_4$ and the overall yield is not less than about 22% by weight, dry basis.

6. The process of claim 1 wherein the acid concentration is from 12 to about 25% by weight, the acid concentration being selected to provide a minimum Iodine number of about 1,000 and a Molasses number below about 200.

7. Hard granular activated carbon made by the process of claim 6 and suitable for use in gas and air purification applications and having a minimum carbon tetrachloride number of about 50.

8. The process of claim 6 wherein the acid concentration is from about 15 to about 25% by weight.

9. The process of claim 1 wherein the acid concentration is from about 1 to about 12% by weight, the acid concentration being selected to provide a minimum Iodine number of about 900 and a minimum Molasses number of about 200.

10. Hard granular activated carbon made by the process of claim 9 suitable for use in water and waste water treatment.

11. The process of claim 9 wherein the acid concentration is from about 2 to about 5% by weight.

12. The process of claim 1 wherein the powder is not less than about 60% −325 mesh.

13. The process of claim 1 wherein the powder is more than about 65% −325 mesh.

14. The process of claim 1 wherein the powder is compressed to form shapes under a pressure of about 40,000 psi or more.

15. The process of claim 1 wherein the powder is continually compressed to form shapes and the fines are recycled.

16. The process of claim 1 wherein the heating rate to activation temperature is about 500° C. per hour or more, and the time at activation temperature is about 1 hour to about 6 hours.

17. The process of claim 1 wherein said granules after being washed to remove the acid are dried to a moisture content below about 15% by weight and thereafter mixed with about 5 to about 15% by weight of a carbonaceous binder.

18. Hard granular activated carbon made by the process of claim 17 and having an abrasion number of at least 70.

19. The process of claim 1 wherein said granules after being washed to remove the acid are dried partially to a moisture content of about 10 to about 25% by weight, with 0% addition of a carbonaceous binder.

20. Hard granular activated carbon made by the process of claim 19 and having and an abrasion number of at least 70.

* * * * *